(12) United States Patent
Ishizu

(10) Patent No.: US 9,986,145 B2
(45) Date of Patent: May 29, 2018

(54) COMMUNICATION APPARATUS, CONTROL METHOD OF COMMUNICATION APPARATUS, AND RECORDING MEDIUM

(71) Applicant: CANON KABUSHIKI KAISHA, Tokyo (JP)

(72) Inventor: Akihiko Ishizu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 186 days.

(21) Appl. No.: 14/010,263

(22) Filed: Aug. 26, 2013

(65) Prior Publication Data

US 2014/0063270 A1 Mar. 6, 2014

(30) Foreign Application Priority Data

Aug. 29, 2012 (JP) .................. 2012-188703

(51) Int. Cl.
*G06F 15/16* (2006.01)
*H04N 5/232* (2006.01)
*G06F 3/00* (2006.01)
*H04N 1/32* (2006.01)

(52) U.S. Cl.
CPC ......... *H04N 5/23206* (2013.01); *G06F 3/005* (2013.01); *H04N 1/32411* (2013.01)

(58) Field of Classification Search
CPC ................ H04N 5/23203; H04N 5/23206
See application file for complete search history.

(56) References Cited

U.S. PATENT DOCUMENTS

| | | | | |
|---|---|---|---|---|
| 2008/0298305 A1* | 12/2008 | Nakamura | ............ | H04L 63/068 370/328 |
| 2009/0022091 A1* | 1/2009 | Buer | ................... | H04L 12/5691 370/328 |
| 2009/0109294 A1* | 4/2009 | Cummings et al. | ....... | 348/207.1 |
| 2010/0172291 A1* | 7/2010 | Kim | ...................... | H04W 48/20 370/328 |
| 2011/0037865 A1* | 2/2011 | Takagi | ................... | H04N 5/232 348/211.9 |
| 2011/0047597 A1* | 2/2011 | Mahaffey | .............. | G06F 21/564 726/3 |

(Continued)

FOREIGN PATENT DOCUMENTS

| | | |
|---|---|---|
| JP | 2004-120461 A | 4/2004 |
| JP | 2007-166577 A | 6/2007 |

(Continued)

*Primary Examiner* — Aftab N. Khan
(74) *Attorney, Agent, or Firm* — Canon U.S.A., Inc. IP Division

(57) ABSTRACT

A communication apparatus capable of participating in a network formed by a relay apparatus, the communication apparatus includes a data communication unit configured to establish communication with a data processing apparatus via a first network, and perform data communication with the data processing apparatus, a reception unit configured to receive a notification indicating whether the data processing apparatus has formed the first network as the relay apparatus, from the data processing apparatus, and a control unit configured, if a notification indicating that the data processing apparatus has formed the first network as the relay apparatus is received by the reception unit, to perform control to restrict transmission or reception of data via an Internet.

13 Claims, 14 Drawing Sheets

(56) References Cited

U.S. PATENT DOCUMENTS

| | | |
|---|---|---|
| 2012/0099476 A1* | 4/2012 | Mahaffy et al. .............. 370/254 |
| 2012/0120934 A1* | 5/2012 | Cho .............................. 370/338 |
| 2013/0024795 A1* | 1/2013 | Robotham et al. ........... 715/769 |

FOREIGN PATENT DOCUMENTS

| | | | |
|---|---|---|---|
| JP | 2008-532438 A | 8/2008 |
| JP | 2011-018979 A | 1/2011 |
| JP | 2012-065259 A | 3/2012 |

\* cited by examiner

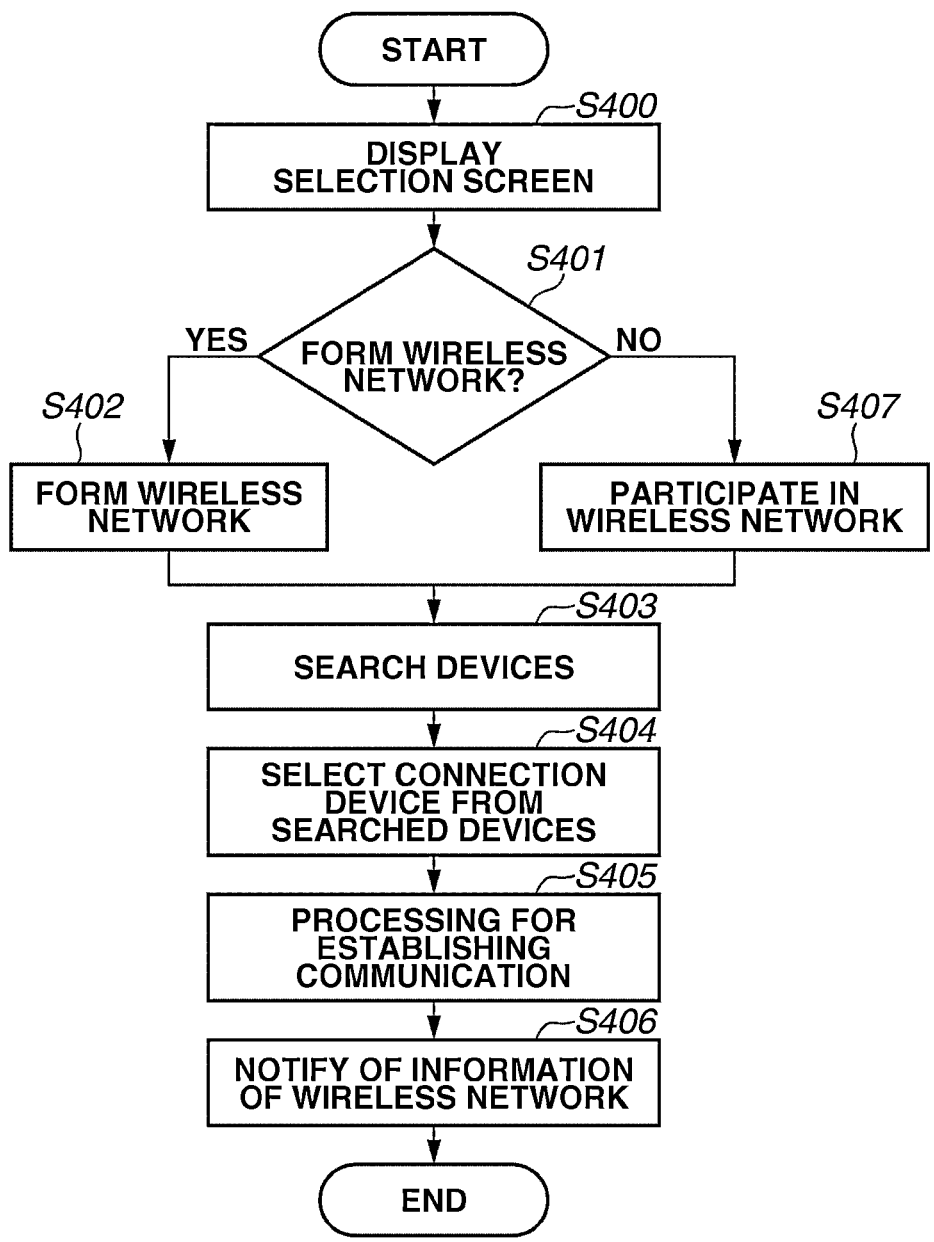

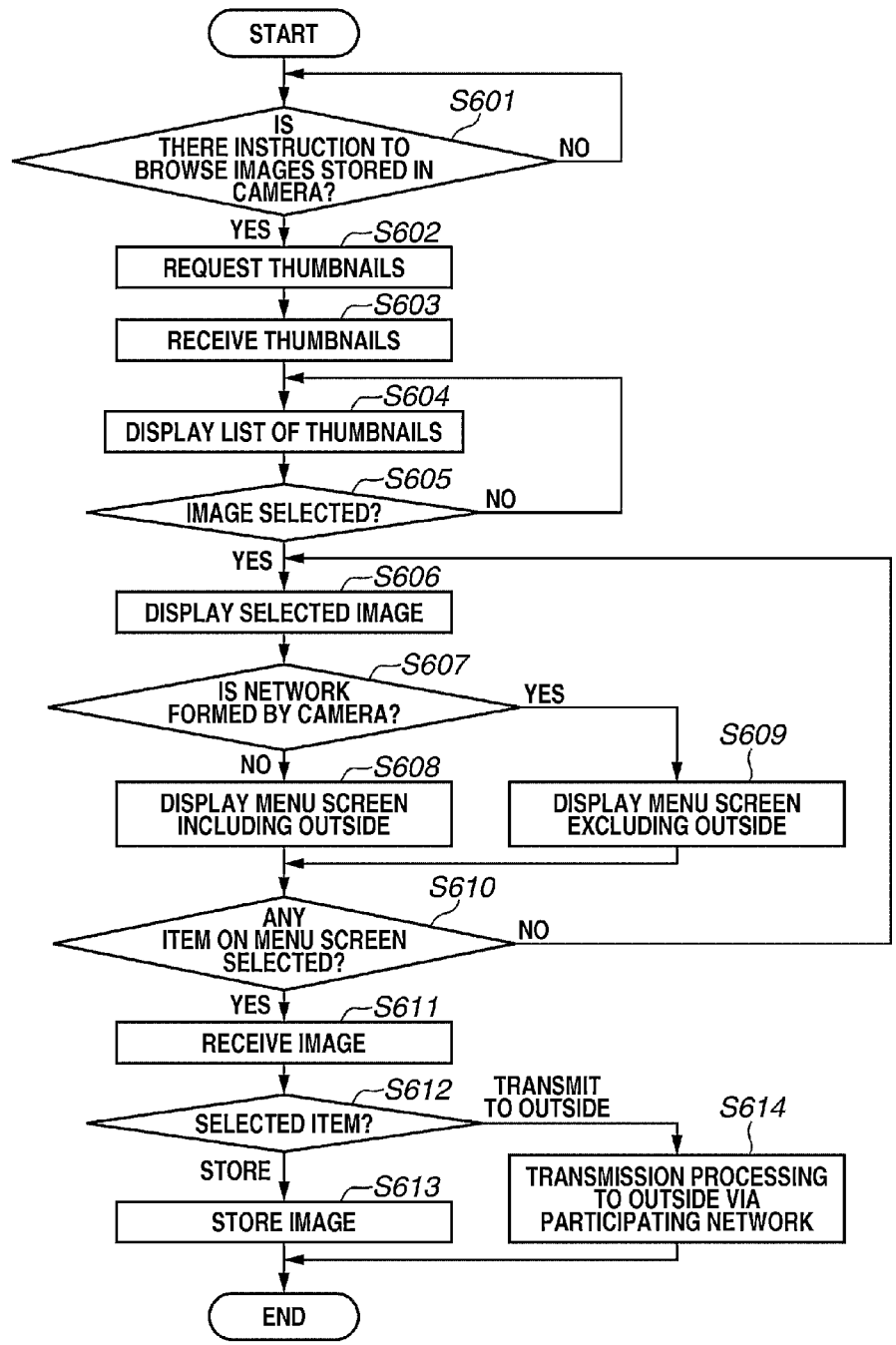

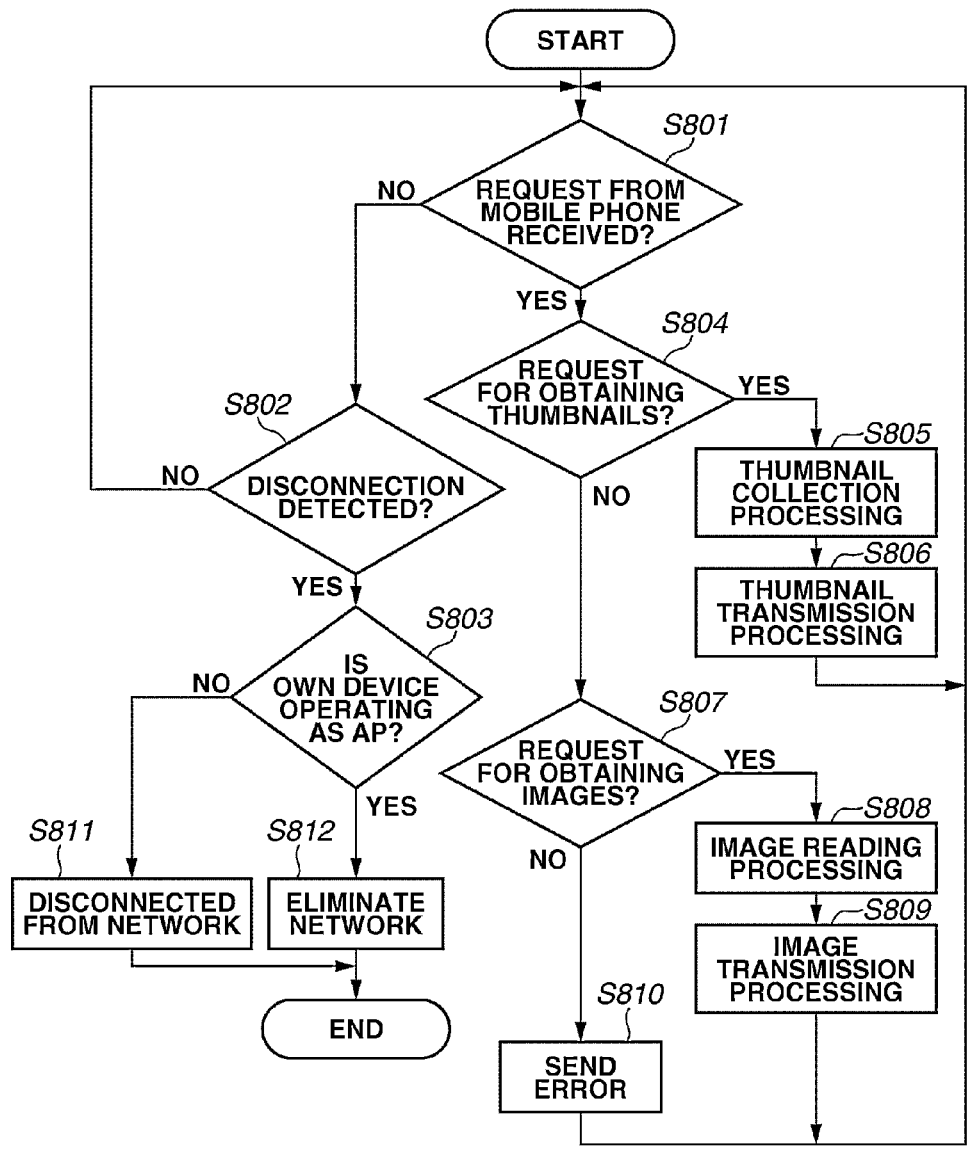

COMMUNICATION APPARATUS, CONTROL METHOD OF COMMUNICATION APPARATUS, AND RECORDING MEDIUM

BACKGROUND

Technical Field

Aspects of the present invention relate to a technique for communicating with other devices via a network.

Description of the Related Art

A technique for equipping a data processing apparatus such as a digital camera with wireless communication function, and transmitting image data retained by the data processing apparatus to an external apparatus is known. By using the function, it has become possible to transmit image data more easily to an external apparatus.

In recent years, a digital camera equipped with a simple access point (for example, micro access point) function has been also known. When a digital camera activates the simple access point function, another apparatus detects the digital camera as an access point, and participates in a network formed by the digital camera. By doing so, it becomes possible to cause the digital camera and another apparatus to easily communicate with each other.

SUMMARY

According to an aspect of the present invention, a communication apparatus capable of participating in a network formed by a relay apparatus, the communication apparatus includes a data communication unit configured to establish communication with a data processing apparatus via a first network, and perform data communication with the data processing apparatus, a reception unit configured to receive a notification indicating whether the data processing apparatus has formed the first network as the relay apparatus, from the data processing apparatus, and a control unit configured, if a notification indicating that the data processing apparatus has formed the first network as the relay apparatus is received by the reception unit, to perform control to restrict transmission or reception of data via an Internet.

Further features and aspects of the present invention will become apparent from the following description of exemplary embodiments with reference to the attached drawings.

BRIEF DESCRIPTION OF THE DRAWINGS

FIG. 4 is a flowchart illustrating an operation of the digital camera according to the first exemplary embodiment.

FIG. 6 is a flowchart illustrating an operation of the mobile phone according to the first exemplary embodiment.

FIG. 8 is a flowchart illustrating an operation of the mobile phone according to the first exemplary embodiment.

DESCRIPTION OF THE EMBODIMENTS

A first exemplary embodiment will be described.
Configuration of Digital Camera

Figure 1:
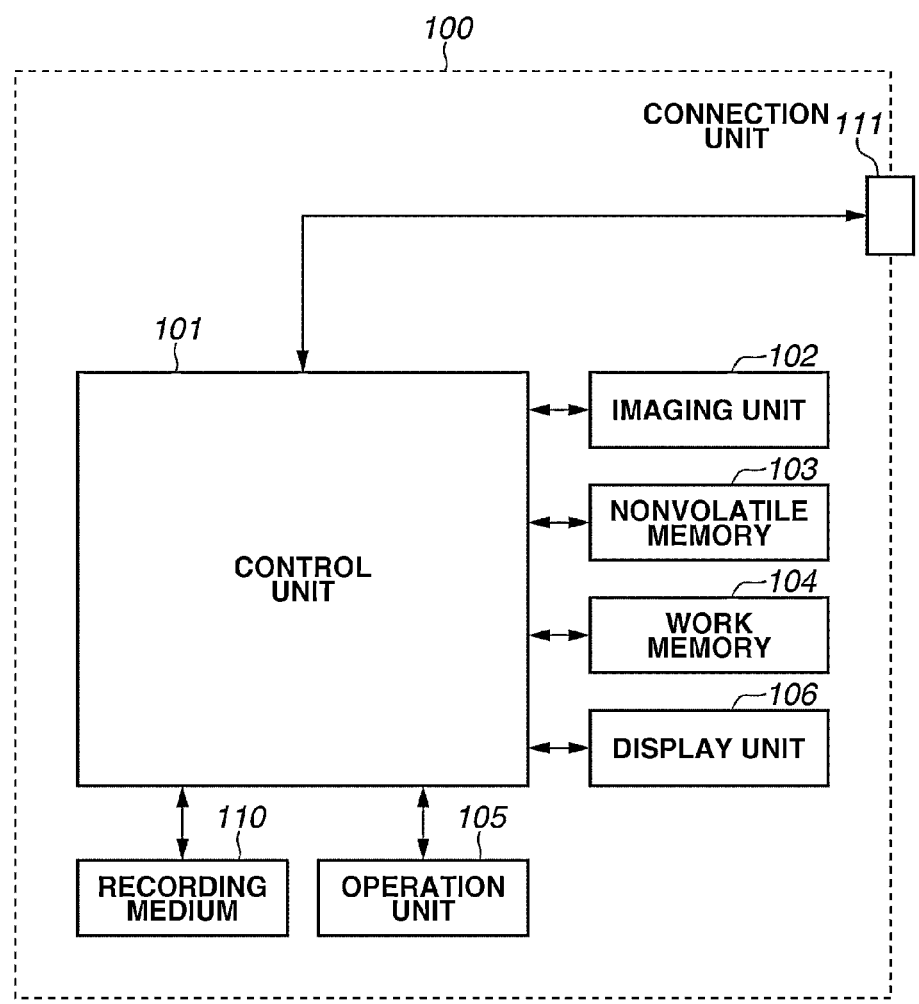
FIG. 1 is a block diagram illustrating a configuration of a digital camera according to a first exemplary embodiment.

FIG. 1 is a block diagram illustrating a configuration example of a digital camera 100 as an example of a data processing apparatus according to the present exemplary embodiment. As an example of the data processing apparatus, the digital camera will be described, but the data processing apparatus is not limited to this. For example, the data processing apparatus may be an information processing apparatus such as a mobile type media player or a tablet device, or a personal computer.

A control unit 101 controls respective components of the digital camera 100, according to an input signal or a program described below. Instead of controlling the entire apparatus by the control unit 101, the entire apparatus may be controlled by sharing the processing by a plurality of pieces of hardware.

An imaging unit 102 converts an object light when an image is formed by a lens included in the imaging unit 102 into an electrical signal, performs noise reduction processing or the like and outputs digital data as image data. After captured image data has been accumulated in a buffer memory, a predetermined calculation is performed by the control unit 101, and the captured image data is recorded on a recording medium 110.

A nonvolatile memory 103 is an electrically erasable/recordable nonvolatile memory, which stores therein programs described below that will be executed by the control unit 101.

A work memory 104 is used as a buffer memory that temporarily retains the image data captured by the imaging unit 102, a memory for image display of a display unit 106, or a work area of the control unit 101.

The operation unit 105 is used to receive an instruction that a user gives to the digital camera 100, from the user. The operation unit 105 includes operating members such as for example, a power button for the user to instruct ON/OFF of a power source of the digital camera 100, a release switch for instructing image capturing, and a reproducing button for instructing reproduction of the image data. Also, a touch panel formed in the display unit 106 described below is included in the operation unit 105. The release switch has a SW1 and a SW2. The release switch enters half-pressed state, and thereby the SW1 is turned ON. Accordingly, the operation unit 105 receives instructions for performing preparations for image capturing such as AF (autofocus) processing, automatic exposure (AE) processing, auto-white balance (AWB) processing, and flash preliminary light emission (EF) processing. Further, the release switch enters full-pressed state, and thereby the SW2 is turned ON. Accordingly, the operation unit 105 receives an instruction for performing image capturing.

The display unit 106 performs display of a view finder image when image capturing is performed, display of captured image data, character display for a dialogue operation, and the like. The display unit 106 does not necessarily need to be incorporated in the digital camera 100. The digital camera 100 only needs to be able to connect to an internal or external display unit 106, and to have at least a display control function of controlling a display of the display unit 106.

The recording medium 110 can record image data output from the imaging unit 102. The recording medium 110 may be configured to be detachable from the digital camera 100, or may be incorporated in the digital camera 100. That is, the digital camera 100 only needs to have at least a means for accessing to the recording medium 110.

A connection unit 111 is an interface for connecting to an external apparatus. The digital camera 100 according to the present exemplary embodiment can perform exchange of data with the external apparatus, via the connection unit 111. In the present exemplary embodiment, the connection unit 111 includes an interface for communicating with the external apparatus via a wireless LAN. The control unit 101 realizes wireless communication with the external apparatus, by controlling the connection unit 111. The communication scheme is not to be considered limited to the wireless LAN.

The digital camera 100 in the present exemplary embodiment can operate as a slave apparatus in an infrastructure mode. By connecting to surrounding access point (hereinafter, an AP), in case of operating as a slave apparatus, the digital camera 100 can participate in a network formed by the AP. Further, the digital camera 100 in the present exemplary embodiment can also operate as a simple AP (for example, micro access point) with more limited functions, though a kind of AP. The AP in the present exemplary embodiment is an example of a relay apparatus. When operating as a simple AP, the digital camera 100 forms a network by itself. Apparatuses around the digital camera 100 recognize the digital camera 100 as an AP, and become able to participate in the network formed by the digital camera 100. A program for causing the digital camera 100 to operate as described above is assumed to be retained in the nonvolatile memory 103.

The digital camera 100 in the present exemplary embodiment, is a simple AP not having a gateway function of transferring the data received from the slave apparatus to an Internet provider, though a kind of AP. Therefore, even when the digital camera 100 receives data from another apparatus participating in the network formed by the own device, the digital camera 100 cannot transfer the received data to the network such as the Internet.

The above is descriptions about the digital camera 100. Next, a mobile phone 200 which is an example of an external apparatus will be described.

Configuration of Mobile Phone

Figure 2:
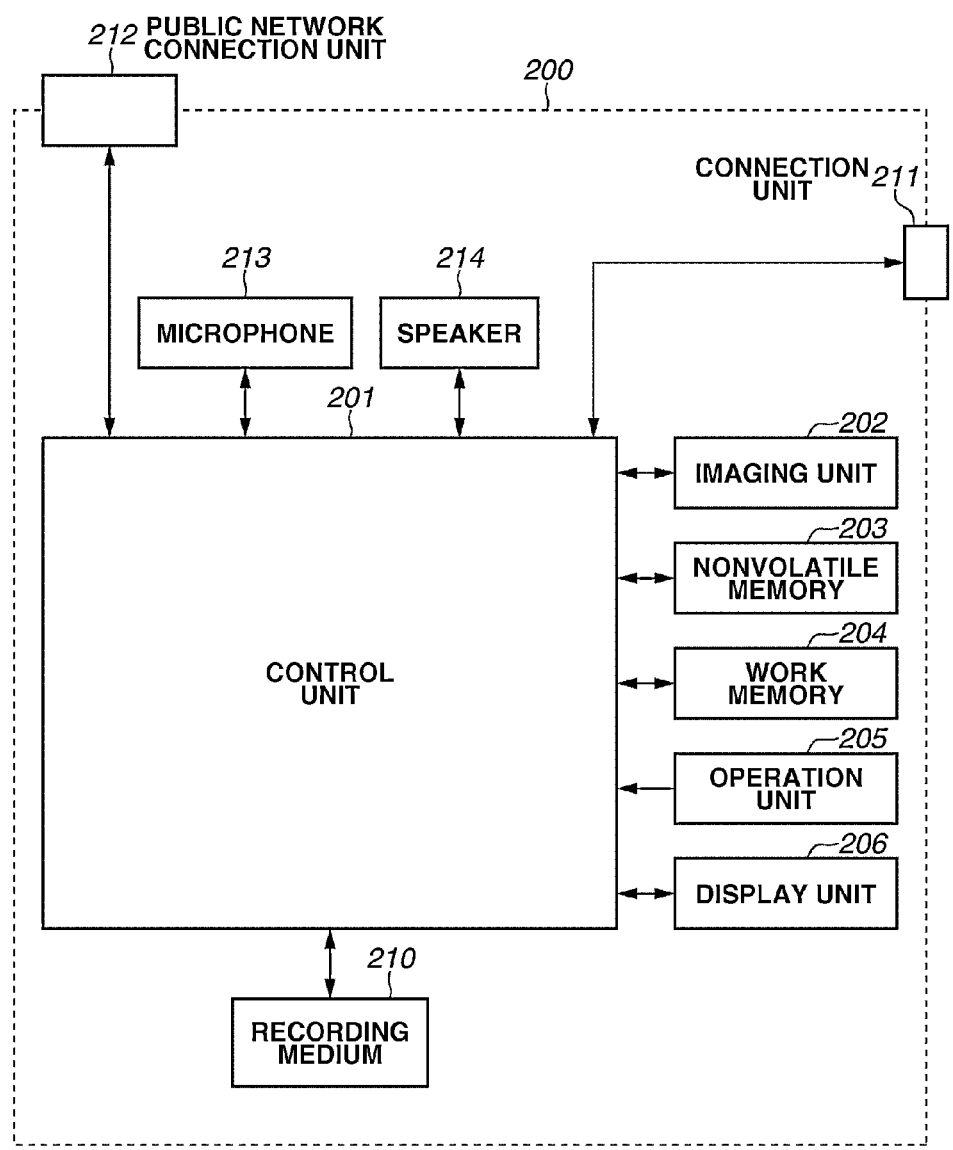
FIG. 2 is a block diagram illustrating a configuration of a mobile phone according to the first exemplary embodiment.

FIG. 2 is a block diagram illustrating a configuration example of the mobile phone 200 which is an example of the communication apparatus according to the present exemplary embodiment. Although the mobile phone will be described as an example of the communication apparatus, the communication apparatus is not limited to this. For example, the communication apparatus may be an information processing apparatus such as a wireless-function-equipped digital camera, a mobile type media player or a tablet device, a personal computer, or a smart phone.

A control unit 201 controls respective components of the mobile phone 200, according to an input signal, or a program described below. Instead of controlling the entire apparatus by the control unit 201, the entire apparatus may be controlled by sharing the processing by a plurality of pieces of hardware.

An imaging unit 202 converts an object light which has formed an image using a lens included in the imaging unit 202 into an electric signal, and performs noise reduction processing or the like to output digital data as image data. The predetermined calculation is performed in the control unit 201, after the captured image data has been accumulated in the buffer memory, and then is recorded on the recording medium 210.

A nonvolatile memory 203 is an electrically erasable/recordable nonvolatile memory, and stores therein various types of programs executed by the control unit 201. A program for communicating with the digital camera 100 is also retained in the nonvolatile memory 203, and is supposed to be installed as a camera communication application. The processing of the mobile phone 200 in the present exemplary embodiment is realized by reading a program provided by the camera communication application. The camera communication application is supposed to have a program for utilizing basic functions of an operating system (OS) installed in the mobile phone 200. The OS of the mobile phone 200 may have a program for realizing the processing in the present exemplary embodiment.

A work memory 204 is used as a buffer memory that temporarily stores image data generated by the imaging unit 202, or a memory for an image display of a display unit 206, or a work area of the control unit 201, or the like.

An operation unit 205 is used to receive an instruction to the mobile phone 200 from the user. The operation unit 205 includes operating members such as for example, a power button for the user to instruct ON/OFF of power source of the mobile phone 200, and a touch panel formed on the display unit 206.

The display unit 206 performs display of image data, character display for a dialogue operation or the like. The display unit 206 does not necessarily need to be incorporated in the mobile phone 200. The mobile phone 200 only needs to be able to connect to the display unit 206, and at least to have a display control function of controlling a display of the display unit 206.

A recording medium 210 can record image data output from the imaging unit 202. The recording medium 210 may be configured to be detachable from the mobile phone 200, or may be incorporated in the mobile phone 200. That is, the mobile phone 200 only needs to have at least a means for accessing to the recording medium 210.

A connection unit 211 is an interface for connecting to an external apparatus. The mobile phone 200 according to the present exemplary embodiment can perform exchange of data with the external apparatus, via the connection unit 211. In the present exemplary embodiment, the connection unit 211 includes an interface for communicating with the external apparatus via the wireless local area network (LAN). The control unit 201 realizes wireless communication with the external apparatus, by controlling the connection unit 211. The digital camera 100 in the present exemplary embodiment can operate at least as a slave apparatus in an infrastructure mode, and can participate in a network formed by surrounding AP.

A public network connection unit 212 is an interface to be used when public wireless communication is performed. The mobile phone 200 can perform telephone call and data communications with other devices, via the public network connection unit 212. When performing telephone call, the control unit 201 performs input and output of audio signals via a microphone 213 and a speaker 214. In the present exemplary embodiment, the public network connection unit 212 includes an interface for performing communications using third generation (3G). Not only 3G, but also another communication scheme what is called fourth generation (4G), such as Long Term Evolution (LTE) or Worldwide Interoperability for Microwave Access (WiMAX), Asymmetric Digital Subscriber Line (ADSL), Fiber To The Home (FTTH) may be used. Further, the connection unit 211 and the public network connection unit 212 do not necessarily have to configure with independent hardware, for example these independent hardware can also share one antenna. The above is description of the mobile phone 200.

Outline of Connection Form

Figure 3A:
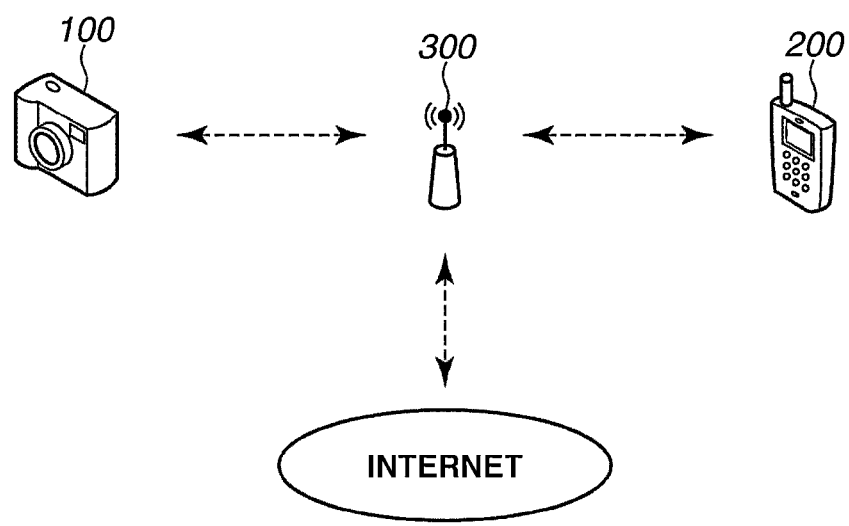
FIGS. 3A and 3B are diagrams each illustrating a network configuration according to the first exemplary embodiment.
Figure 3B:

FIGS. 3A and 3B are diagrams each schematically representing a connection form between the digital camera 100 and the mobile phone 200 in the present exemplary embodiment. In a case where the digital camera 100 and the mobile phone 200 transmit and receive data via wireless, two connection forms of FIG. 3A and FIG. 3B are conceivable.

FIG. 3A is a form in which the digital camera 100 and the mobile phone 200 participate in a wireless LAN network formed by an external AP 300, which is an example of an external relay apparatus. The digital camera 100 and the mobile phone 200 detect a beacon signal which the external AP 300 regularly transmits, and participate in the wireless LAN network formed by the external AP 300. The digital camera 100 and the mobile phone 200 become able to transmit and receive data via the wireless LAN (establish communications between the devices), through finding of mutual devices, and obtaining capabilities of the devices, after having participated in the same wireless LAN network.

Further, the external AP 300 in the present exemplary embodiment can connect to an external network such as an Internet using a public network or the like. Therefore, the mobile phone 200 can transmit the data, via the external AP 300 over the Internet.

FIG. 3B is a form in which the digital camera 100 and the mobile phone 200 directly connect to each other, without involving the external AP 300. In this case, the digital camera 100 operates as a simple AP and forms the wireless LAN network. The digital camera 100, when operating as the simple AP, starts regular transmission of a beacon signal. The mobile phone 200 detects the beacon signal, and participates in the wireless LAN network formed by the digital camera 100. Then, similarly to a case of FIG. 3A, communications are established through finding of mutual devices, obtaining of capabilities of the devices, and the like, and transmission and reception of the data becomes possible.

As described above, the digital camera 100 in the present exemplary embodiment does not have communication function to an external network such as the Internet. Therefore, the mobile phone 200 participating in the wireless LAN network formed by the digital camera 100 cannot transmit the data to the Internet via the simple AP.

As described above, the digital camera 100 and the mobile phone 200 have two connection forms. In the present exemplary embodiment, an example of performing an appropriate control depending on these connection forms will be described.

Connection Processing

FIG. 4 is a flowchart illustrating the processing performed by the digital camera 100, when connecting to the mobile phone 200. The processing illustrated in the flowchart is realized by controlling respective components of the digital camera 100 by the control unit 101 of the digital camera 100, according to input signal or a program. Unless otherwise specified, even another flowchart illustrating the processing performed by the digital camera 100 is similarly realized. The flowchart is started in response to the fact that the user of the digital camera 100 has instructed connection with other apparatus by a menu operation or the like.

Figure 5A:
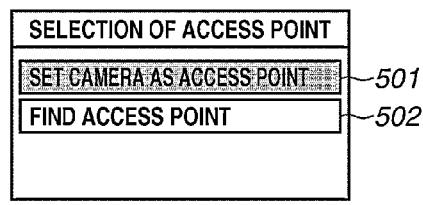
FIGS. 5A, 5B, 5C, 5D, 5E, and 5F each is an example of a display screen according to the first the exemplary embodiment.

In step S400, the control unit 101 displays on the display unit 106 a screen for allowing the user to select participation in the wireless LAN network formed by the external AP, or causing the own device to operate as a simple AP. An example of the screen to be displayed in the step is illustrated in FIG. 5A.

In step S401, if it is determined that a button 501 has been selected by a user operation, the control unit 101 determines that formation of a wireless LAN network has been selected (YES in step S401), and advances the processing to step S402. If it is determined that a button 502 has been selected by the user operation, the control unit 101 determines that participation in the wireless LAN network formed by the external AP has been selected (NO in step S401), and advances the processing to step S407.

Figure 5B:
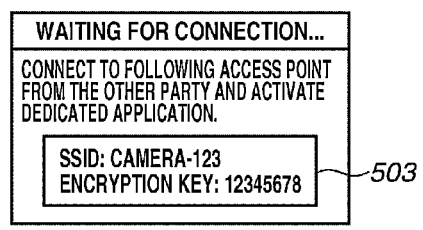

In step S402, the control unit 101 forms the wireless LAN network. Specifically, the control unit 101 generates an Extended Service Set Identifier (ESSID), Basic Service Set Identifier (BSSID), an authentication method, a code type, and an encryption key necessary for formation of the network. Further, the control unit 101 displays at least the ESSID and the encryption key on the display unit 106, as information necessary for the connected device to participate in the network. An example of the display is illustrated in FIG. 5B. In the example of FIG. 5B, the ESSID is determined as "CAMERA-123", and the encryption key as "12345678", as indicated in a dialog 503. The encryption key and the ESSID may be generated for each connection or for each connected device, or may be always the same. Furthermore in the step S402, in order to enable communication with another device, the control unit 101 performs assignment of an IP address, and setting of a sub-network, then the processing proceeds to step S403.

Figure 5C:
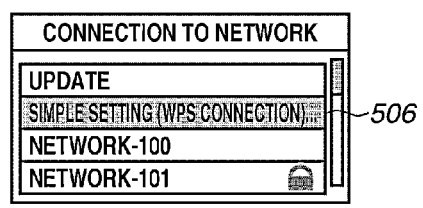

On the other hand, if the processing has proceeded to step S407 (NO in step S401), the control unit 101 scans surrounding wireless LAN network, and displays a list of the ESSIDs contained in beacon signals detected as the result on the display unit 106. An example of the screen at this time is illustrated in FIG. 5C. In the example of FIG. 5C, the ESSIDs of "NETWORK-100" and "NETWORK-101" are detected. When a wireless LAN network is selected from a list 506 of FIG. 5C by the user operation, the control unit 101 performs processing for participating in the selected wireless LAN network, that is, performs connection processing to an AP. Furthermore, in order to enable communication with other devices, the control unit 101 performs assignment of an IP address, and setting of a sub-network, and advances the processing to step S403.

Figure 5D:
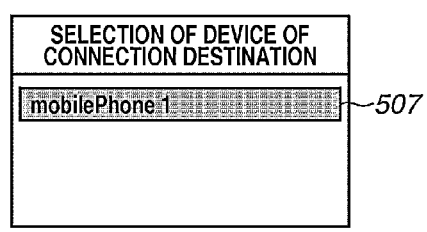
Figure 5E:
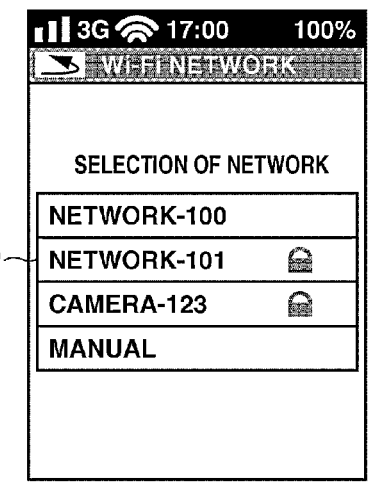

In step S403, the control unit 101 searches connectable devices within the same network. In order that the mobile phone 200 becomes searchable by the digital camera 100, an operation on the mobile phone 200 side becomes necessary. Hereinbelow, the operation on the mobile phone 200 side will be described with reference to FIGS. 5E through 5H. FIGS. 5G and 5H are flowcharts each illustrating the processing of the mobile phone 200 in the present exemplary embodiment. The processing illustrated in the flowcharts is realized by controlling respective components of the mobile phone 200, according to an input signal or a program, by the control unit 201 of the mobile phone 200. Unless otherwise specified, the same applies to another flowchart illustrating the processing of the mobile phone 200.

First, in response to the fact that a predetermined operation has been performed by the user of the mobile phone 200, in step S551, the control unit 201 causes a screen for selecting a wireless LAN network in which the own device participates to be displayed on the display unit 206. When shifted to this screen, the control unit 201 scans surrounding wireless LAN networks, and displays a list 510 of the ESSIDs detected as the result. An example of the screen is illustrated in FIG. 5E. In the present exemplary embodiment, these processing are performed by the functions of the OS of the mobile phone 200 before activation of the camera communication application, but the camera communication application activated in advance may perform the processing in cooperation with the functions of the OS of the mobile phone 200. In a case where the digital camera 100 operates as a simple AP, the mobile phone 200 detects an ESSID of the digital camera 100, and displays the ESSID on the list 510. In FIG. 5E, "CAMERA-123" is displayed as the ESSID of the digital camera 100.

In step S552, the control unit 201 waits for selection of any one of ESSID out of the list 510. When any one of ESSID out of the list 510 is select by the user operation, in step S553, the control unit 201 performs processing for participating in the corresponding wireless LAN network. Then, participation in the network is completed.

After participating in the network, the user of the mobile phone 200 activates the camera communication application installed on the mobile phone 200. The processing of the mobile phone 200 after activating the camera communication application will be described with reference to the flowchart of FIG. 5H. The main functions of the camera communication application include a function of establishing communications with the digital camera existing within the same network, a function of transmitting and receiving content data such as image data, and a function of controlling the processing for transmitting to a server the content data which the own device has.

Figure 5F:
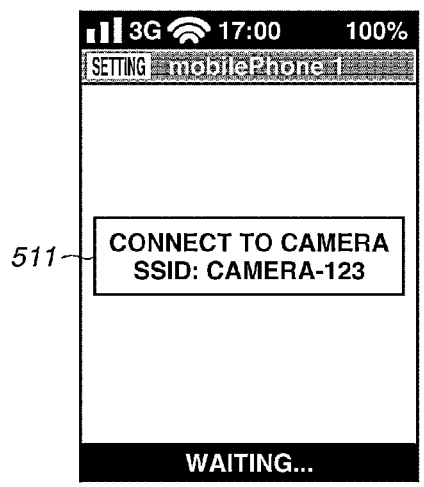
Figure 5G:
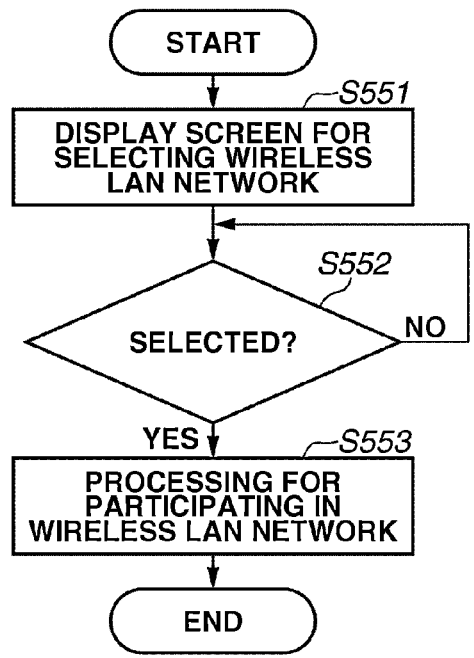
FIGS. 5G and 5H are flowcharts each illustrating an operation of the mobile phone according to the first exemplary embodiment.
Figure 5H:
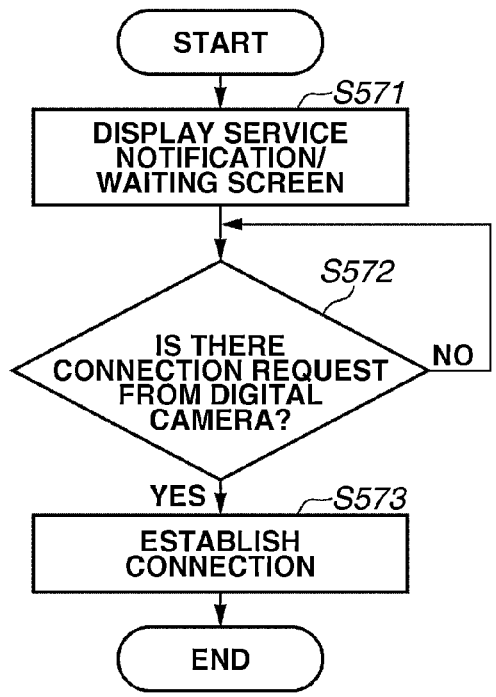

When the camera communication application is activated based on the user operation, in step S571, a waiting screen like the one of FIG. 5F is displayed on the display unit 206. In a dialog 511, a SSID of the currently participating network is displayed. The example of FIG. 5F indicates a case where "CAMERA-123" is selected on the screen of FIG. 5E. Further, after activating the camera communication application, the mobile phone 200 performs notification of service of the own device via the wireless LAN network so that the digital camera 100 can detect the mobile phone 200. The digital camera 100 can detect the mobile phone 200 based on the notification of this service. The notification of this service includes a device name and a Universally Unique Identifier (UUID) of the mobile phone 200. In step S572, the control unit 201 waits for a connection request from the digital camera 100. If it is determined that there has been a connection request (YES in step S572), in step S573, the control unit 201 establishes communication with the digital camera 100.

Returning to description of FIG. 4. In step S403, the control unit 101 searches for connectable devices that exist within the same network. As described above, if service notification has been performed on the mobile phone 200 side, the digital camera 100 can detect the mobile phone 200. In a case where the connectable devices are detected as a result of the search, the control unit 101 displays a list of the device names contained in the notification of the service on the display unit 106. An example of list display is illustrated in FIG. 5D. Similarly, UUIDs and device names contained in the notification of service are stored in the work memory 104 in association with each other.

In the present exemplary embodiment, a configuration in which the device names and the UUIDs are contained in the notification of service is used, but a configuration in which the digital camera 100 that receives the notification of service makes inquiry to the mobile phone 200 about the device names and the UUIDs is acceptable.

In step S404, the control unit 101 receives a user operation to select any one out of the device names displayed in the list in step S403.

In step S405, the control unit 101 transmits a connection request to the mobile phone 200 using the UUID of the device selected in step S404, and starts processing for establishing communication with the selected device. In the present exemplary embodiment, connection is executed using the UUID of the apparatus on the other end, but connection may be executed after identifying an IP address or a port number from the UUID, or an IP address may be obtained at a point in time when performing search. After establishing communication, the processing proceeds to step S406.

In step S406, the control unit 101 notifies the mobile phone 200 which has established communication in step S405 of whether a wireless LAN network in which the own device is currently participating has been formed by a simple AP. Specifically, in a case where the own device operates as the simple AP, and the mobile phone 200 participates in the wireless LAN network of the own device, the digital camera 100 notifies the mobile phone 200 of that the wireless LAN network has been formed by the own device. Further, in a case where the digital camera 100 participates in a wireless LAN network formed by another AP, the digital camera 100 notifies the mobile phone 200 of that the wireless LAN network is not formed by the own device. By the notification, the mobile phone 200 can determine whether the mobile phone 200 is participating in a network formed by the digital camera 100, or in a network formed by another AP. Then based on the notification, the mobile phone 200 can determine whether communication is enabled from the wireless LAN network in which the own device participates to an external network.

Operation after Connection

FIG. 6 is a flowchart illustrating an operation of the mobile phone 200, after establishing communication with the digital camera 100.

Figure 7A:
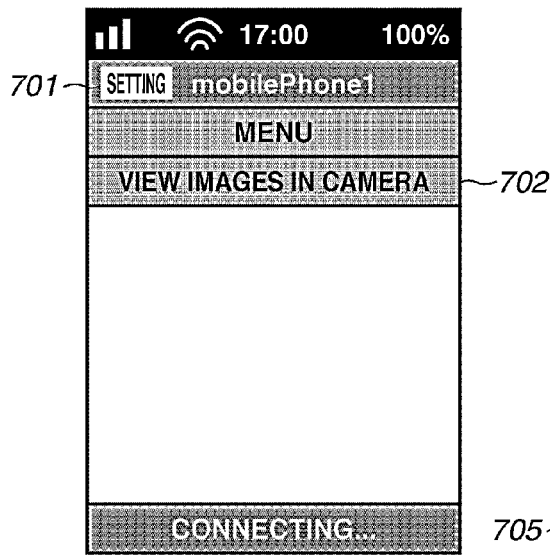
FIGS. 7A, 7B, 7C, 7D, 7E, 7F, 7G, and 7H each is an example of a display screen according to the first exemplary embodiment.

When communication with the digital camera 100 is established, the control unit 201 of the mobile phone 200 displays a menu screen of the camera communication application illustrated in FIG. 7A on the display unit 206. On the menu screen, a setting button 701 and a browse button 702 are displayed. The setting button 701 is a button for performing setting of the device name of the mobile phone 200, and various types of settings in uploading. The browse button 702 is a button for displaying on the display unit 206 the image data stored in the digital camera 100 which has established communication with the mobile phone 200.

In step S601, the control unit 101 determines whether the browse button 702 has been selected. If it is determined that the browse button 702 has been selected (YES in step S601), the processing proceeds to step S602. If it is determined that the browse button 702 has not been selected (NO in step S601), the processing is repeated.

In step S602, the control unit 201 requests the digital camera 100 for thumbnails of the image data which the digital camera 100 has. In response to the request, the digital camera 100 transmits requested thumbnails to the mobile phone 200. Thumbnails may be repeatedly requested for one by one, or transmitting a command for requesting a plurality of pieces all together.

In step S603, the mobile phone 200 receives the thumbnails transmitted from the digital camera 100 via the connection unit 211.

Figure 7C:
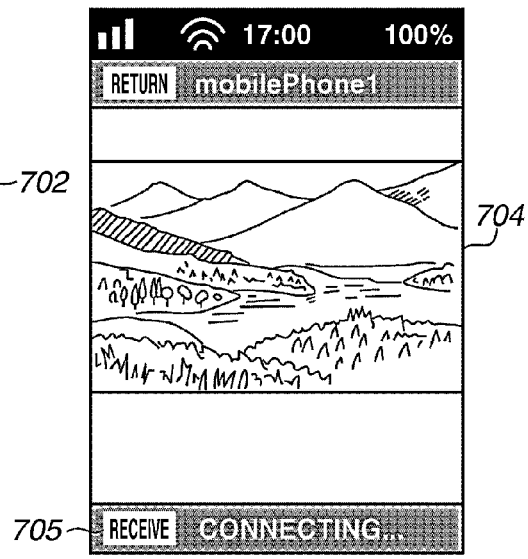
Figure 7B:
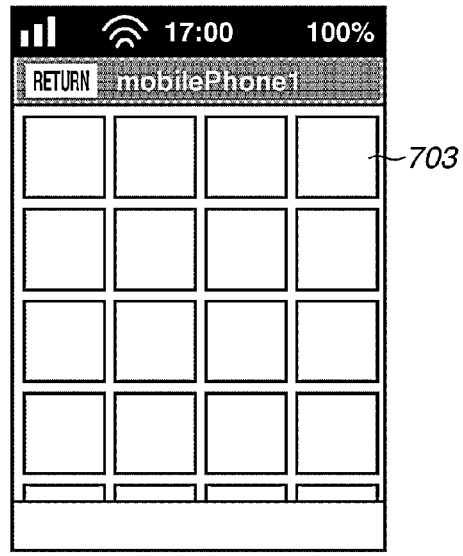

In step S604, the control unit 201 displays in a list the received thumbnails on the display unit 206. An example of display screen is illustrated in FIG. 7B. In the example of FIG. 7B, the thumbnails in 4 columns are displayed, and other image data can be further displayed by a scrolling operation in a vertical direction.

In step S605, the control unit 201 determines whether any thumbnail has been selected from among the thumbnails displayed in the list. If it is determined that any thumbnail has been selected (YES in step S605), the processing proceeds to step S606. Otherwise (NO in step S605), the processing is returned to step S604.

In step S606, the control unit 201 displays the selected thumbnail in a large size. An example of the display is illustrated in FIG. 7C. As illustrated in FIG. 7C, the selected thumbnail is displayed in a larger size than that in FIG. 7B. In step S606, the selected thumbnail is displayed in a large size as it is, but a larger thumbnail or main image data may be requested again to the digital camera 100, in view of the display in a large size.

Further, a receive button 705 is included on the screen illustrated in FIG. 7C. The receive button 705 is a button for receiving the main image data corresponding to the displayed thumbnail from the digital camera 100, and performing the predetermined processing on the received image data. Hereinbelow, descriptions will be given specifically.

When the button 705 is selected by the user operation, the processing proceeds to step S607.

In step S607, the control unit 201 determines whether a network in which the own device is currently participating has been formed by a simple AP function of the digital camera 100. The control unit 201 performs determination in the present step by referring to the notification received from the digital camera in step S406 of FIG. 4. If it is determined that the network in which the own device is currently participating is not a network formed by the simple AP function of the digital camera 100 (NO in step S607), the processing proceeds to step S608. If it is determined that the network in which the own device is currently participating is a network formed by the simple AP function of the digital camera 100 (YES in step S607), the processing proceeds to S609.

First, a case where the processing has proceeded to step S608 will be described. In this case, the control unit 201 determines that the network in which the own device is currently participating is not a network formed by the simple AP function, but is a network formed by an external AP. In other words, it is determined as a connection form as illustrated in FIG. 3A. In this case, the mobile phone 200 can transmit image data via the external AP. Thus, the control unit 201 displays a menu illustrated in FIG. 7D superimposed over the image data in a semi-transparent manner. A plurality of items is contained in the menu, and each acts as an operation button. Hereinbelow, the buttons contained in the menu will be described.

A button 706 is a button for uploading main image data received from the digital camera 100 via the Internet to a social network service (SNS). The user of the mobile phone 200 sets up an SNS at an uploading destination in advance, and when the button 706 is selected, the processing for transmitting the main image data to a server provided by the SNS is started. Alternatively, in response to the button 706 having been selected, the processing for setting up the SNS at the uploading destination may be started.

A button 707 is a button for uploading the main image data received from the digital camera 100 to a content server. The user of the mobile phone 200 sets up the content server at the uploading destination in advance, and when the button 707 is selected, the processing for transmitting the main image data to the content server via the Internet is started. In response to the button 707 having been selected, the processing for setting up the content server at the uploading destination may be started.

A button 708 is a button for transmitting the main image data received from the digital camera 100 as an email attachment. When the button 708 is selected, the control unit 201 activates an email application, and provides a template of the email containing attachment of the received main image data. The user of the mobile phone 200 can transmit an email at an arbitrary address via the Internet, after inputting a desired text.

A button 709 is a button for recording the main image data received from the digital camera 100 on the recording medium 210. When the button 709 is selected, the main image data received from the digital camera 100 is recorded on the recording medium 210.

Figure 7D:
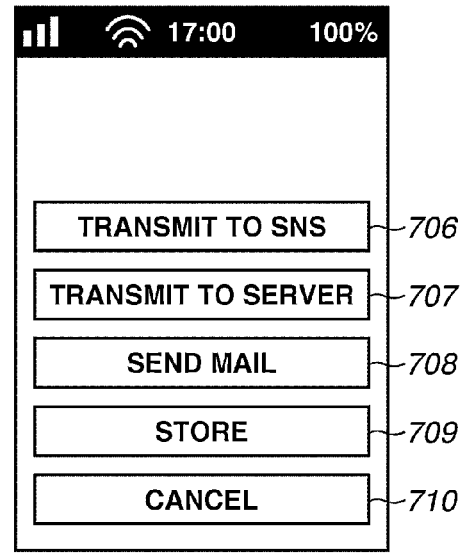

A button 710 as a cancel button erases the menu illustrated in FIG. 7D when selected, and the display returns to the status of FIG. 7C.

Next, a case where the processing has proceeded to step S609 will be described. In this case, the control unit 201 determines that current connection form is the one illustrated in FIG. 3B. In this case, although the mobile phone 200 is connected to the network formed by an AP, the mobile phone 200 cannot transmit the image data to an external network via the AP. Thus, the control unit 201 displays a menu illustrated in FIG. 7E superimposed onto the image data in a semi-transparent manner. In the menu illustrated in FIG. 7E, the buttons 706 through 708 via which the user instructs operations for performing communications via the Internet are displayed to be grayed out, and thus the buttons are made invalid to disable the user selecting the buttons. On the other hand, the button 709 for instructing storage is kept valid. As display form, it is not limited to gray-out, and the buttons 706 through 708 for instructing operations to perform communications via the Internet may not be displayed. In other words, various display forms can be adopted as long as they restrict communications via the Internet. Further, when displaying a menu, first a dialog 714 illustrated in FIG. 7F may be displayed superimposed onto the menu in a semi-transparent manner. The dialog 714 is a message to notify the user of that an operation to perform communications via the Internet cannot be performed. As another exemplary embodiment, the dialog 714 may be displayed if it is determined that any of the buttons 706 through 708 for instructing operations to perform communications via the Internet in FIG. 7E has been selected by the user.

Figure 7E:
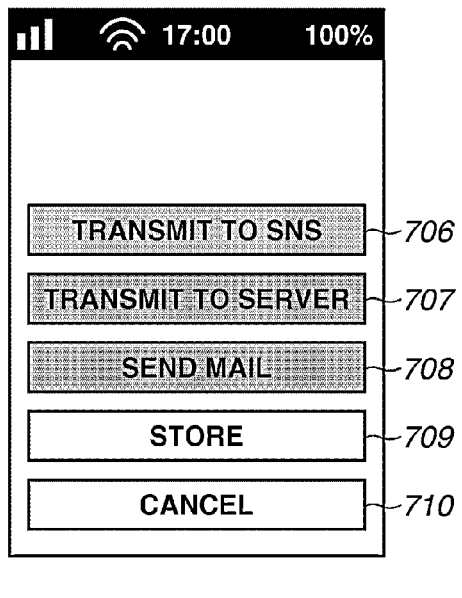

Subsequently in step S610, the control unit 201 determines whether any of the buttons 706 through 709, out of the buttons illustrated in FIGS. 7D and 7E, has been selected. If the control unit 201 determines that any of the buttons 706 through 709 has been selected (YES in step S610), the processing proceeds to step S611. If the control unit 201 determines that the button 710 has been selected (NO in step S610) the processing returns to step S606.

Figure 7G:
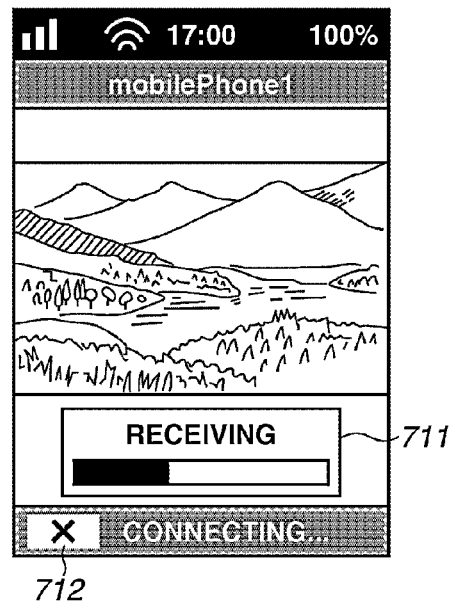
Figure 7F:
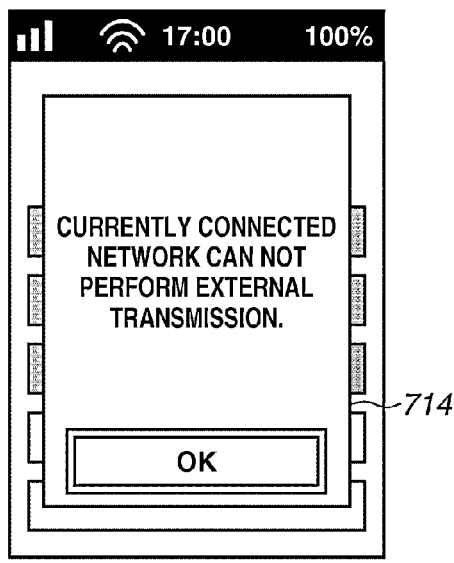

When the processing has proceeded to step S611, the control unit 201 requests the digital camera 100 for image data corresponding to the thumbnails selected in step S605. When the digital camera 100 transmits the image data to the mobile phone 200 in response to the request, the mobile phone 200 receives the image data, and retains the image data in the work memory 204. While the image data is being received, the screen of FIG. 7G is displayed on the display unit 206. The user of the mobile phone 200 can cancel the reception by selecting a button 712 of FIG. 7G.

When reception of the image data is completed, the processing proceeds to step S612, where the control unit 201 determines what processing has been selected in step S610. If the control unit 201 determines that any button of the button 706, the button 707, and the button 708 has been selected, that is, an operation to transmit the received image data to an outside has been selected (TRANSMIT TO OUTSIDE in step S612), the control unit 201 advances the processing to step S614. The button 706, the button 707, or the button 708 is selectable only if a menu screen including the outside is being displayed in step S608. On the other hand, if the control unit 201 determines that the button 709 has been selected, that is, if the control unit 201 determines that an operation to store the received image data in the recording medium 210 without transmitting it to the outside has been selected (STORE in step S612), the control unit 201 advances the processing to step S613.

First, a case where the processing has proceeded to step S613 will be described. In step S613, the control unit 201 stores the image data received in step S611 in the recording medium 210 from the work memory 204, and ends the processing.

Next, a case where the processing has proceeded to step S614 will be described. In step S614, the control unit 201 transmits predetermined transmission information (uniform resource locator (URL) or email addresses) via the Internet and the image data received in step S611, to an external AP. This enables the image data to be transmitted to the predetermined transmission destination from the external AP.

Figure 7H:
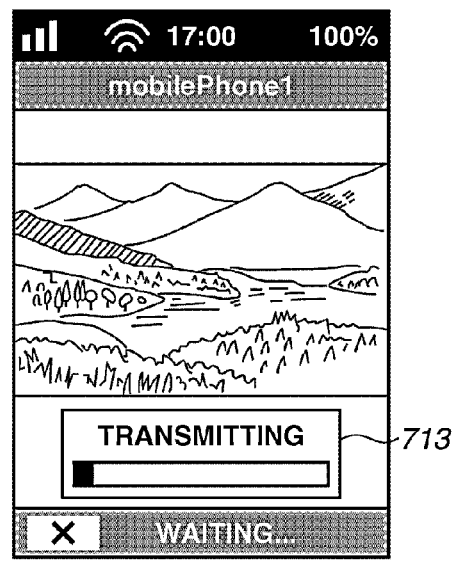

A screen to be displayed on the display unit 206 while processing in step S614 is illustrated in FIG. 7H. On the screen illustrated in FIG. 7H, a dialog 713 notifies the user of that transmission of the image data is being currently performed.

Further, before transmitting the image data in step S614, a screen for adding comments or titles to the image data, and performing settings of the SNS (for example, scope of disclosure or selection of an album) may be displayed.

In this case, an example in which one piece of the image data is received from the digital camera 100, and is transmitted from the mobile phone 200 has been described. Alternatively, the mobile phone 200 may select and receive a plurality of pieces of the image data, and sequentially transmit these to an external network. Further, after once receiving the image data, the mobile phone 200 may be allowed to select which image data to be transmitted from the mobile phone 200.

The above is an operation of the mobile phone 200 after connecting to the digital camera 100. Next, detailed operation on the digital camera 100 side will be described below. FIG. 8 is a flowchart illustrating an operation of the digital camera 100, after connecting to the mobile phone 200.

In step S801, the control unit 101 of the digital camera 100 determines whether a request from the mobile phone 200 has been received via the connection unit 111. If the request has been received (YES in step S801), the processing proceeds to step S804. If the request has not been received (NO in step S801), the processing proceeds to step S802. A request that may be possibly received in this process is either a request for the thumbnails transmitted in step S602, or a request for the image data transmitted in steps S607 and S608.

A case where the processing has proceeded to step S804 will be described. In step S804, the control unit 101 determines whether the request received in step S801 is a request for thumbnails (request transmitted in step S602). If it is determined that the request is a request for thumbnails (YES in step S804), the processing proceeds to step S805. If it is determined that the request is not a request for thumbnails (NO in step S804), the processing proceeds to step S807.

First, a case where the processing has proceeded to step S805 will be described. In step S805, the control unit 101 searches for image data requested from the mobile phone 200, from among the image data stored on the recording medium 110, and loads the thumbnails corresponding to the searched image data into the work memory 104. Of course, the control unit 101 can also load a plurality of thumbnails. At that time, the thumbnails may use the ones already associated with the image data, or new thumbnails may be separately generated.

Subsequently in step S806, the control unit 101 transmits the thumbnails retained in the work memory 104 to the mobile phone 200 that has requested for them, and returns the processing to step S801. As a result of the processing, thumbnail reception processing in step S603 is executed on the mobile phone 200 side. The above is the processing for transmitting the thumbnails from the digital camera 100 to the mobile phone 200.

Next, a case where the processing has proceeded to step S807 will be described. In step S807, the control unit 101 determines whether the request received in step S801 is a request for the image data corresponding to the thumbnails (request transmitted in step S611). If it is determined that the request is a request for the image data (YES in step S807), the processing proceeds to step S808. If it is determined that the request received is not a request for the image data (NO in step S807), the processing proceeds to step S810.

First, a case where the processing has proceeded to step S808 will be described. In step S808, the control unit 101 searches for image data requested, from among the image data stored on the recording medium 110, and loads the searched image data into the work memory 104.

Subsequently in step S809, the control unit 101 transmits the image data retained in the work memory 104 to the mobile phone 200, and returns the processing to step S801. As a result of the processing, image data reception processing in step S611 is executed on the mobile phone 200 side.

On the other hand, in a case where the processing has proceeded to step S810, the control unit 101 determines that the request received is the one to which the own device cannot appropriately respond, and transmits an error notification that indicates accordingly to the mobile phone 200.

Next, a case where the processing has proceeded to step S802 from step S801 will be described. In step S802, the control unit 101 determines whether the connection has been disconnected. Cases where it is determined that the connection has been disconnected in this step includes a case where communication that has been established with the mobile phone 200 is disconnected, a case where the mobile phone 200 no longer exists on a network, a case where the own device becomes unable to receive a beacon signal from an AP, and has lost sight of the network, and the like. In a case where the own device is operating as a simple AP, the own device would not lose sight of the network. If it is determined that the connection has been disconnected (YES in step S802), the processing proceeds to step S803. If it is determined that the connection has not been disconnected (NO in step S802), the processing returns to step S801.

In step S803, the control unit 101 determines whether the own device is operating as a simple AP. If it is determined that the own device is not operating as the simple AP (NO in step S803), the processing proceeds to step S811. If it is determined that the own device is operating as the simple AP (YES in step S803), the processing proceeds to step S812.

In step S811, the control unit 101 performs disconnection processing from the network in which the own device is currently participating. In contrast to this, in step S812, the control unit 101 eliminates the network currently being formed by the own device. Specifically, the control unit 101 stops transmission of the beacon signal, and broadcasts a notification that the network will be eliminated, to the network.

The above is the processing for transmitting the image data from the digital camera 100 to the mobile phone 200.

As described above, the digital camera 100 in the present exemplary embodiment ensures to notify the mobile phone 200 whether the network in which the own device is currently participating has been formed using the simple AP function of the own device. By this configuration, the mobile phone 200 becomes able to execute appropriate processing tailored to features of the network.

Further, in the present exemplary embodiment, it is configured such that the user instructs transmission of the image data from the digital camera 100 to the mobile phone 200, or transmission of the image data to the Internet by operating the mobile phone 200. In contrast to this, the user may transmit the image data to the mobile phone 200 or instruct transmission of the image data from the mobile phone 200 to the Internet by operating the digital camera 100.

Further, in the present exemplary embodiment, it is configured such that the digital camera 100 forms a network and communicates directly with the mobile phone 200. In contrast to this, even in a connection form where devices communicate with each other in advance like Wi-Fi Direct and either one becomes an AP, it is possible to apply the present invention.

Further, in the present exemplary embodiment, there has been taken an example of a control to switch between menu displays when the mobile phone 200 transmits via the Internet the image data received from the digital camera 100, but an application scope of the present invention is not limited to this. For example, if it is determined that the network in which the own device is currently participating is the one formed by the digital camera 100, similar control thereto may be performed when the mobile phone 200 uses applications of utilizing the Internet, such as Web browser or electronic mail of the own device.

A second exemplary embodiment will be described.

In the first exemplary embodiment, a form for changing a menu to be displayed as necessary on the mobile phone 200 side has been described. In contrast to this, in the present exemplary embodiment, a case where the mobile phone 200 has a function of switching a network to be participating from a first network in which the own device was initially participating to a second network as necessary will be described. Since the present exemplary embodiment has much common parts with the first exemplary embodiment, descriptions of the common parts will be omitted, and descriptions will be given with an emphasis on the parts peculiar to the present exemplary embodiment.

Figure 11:
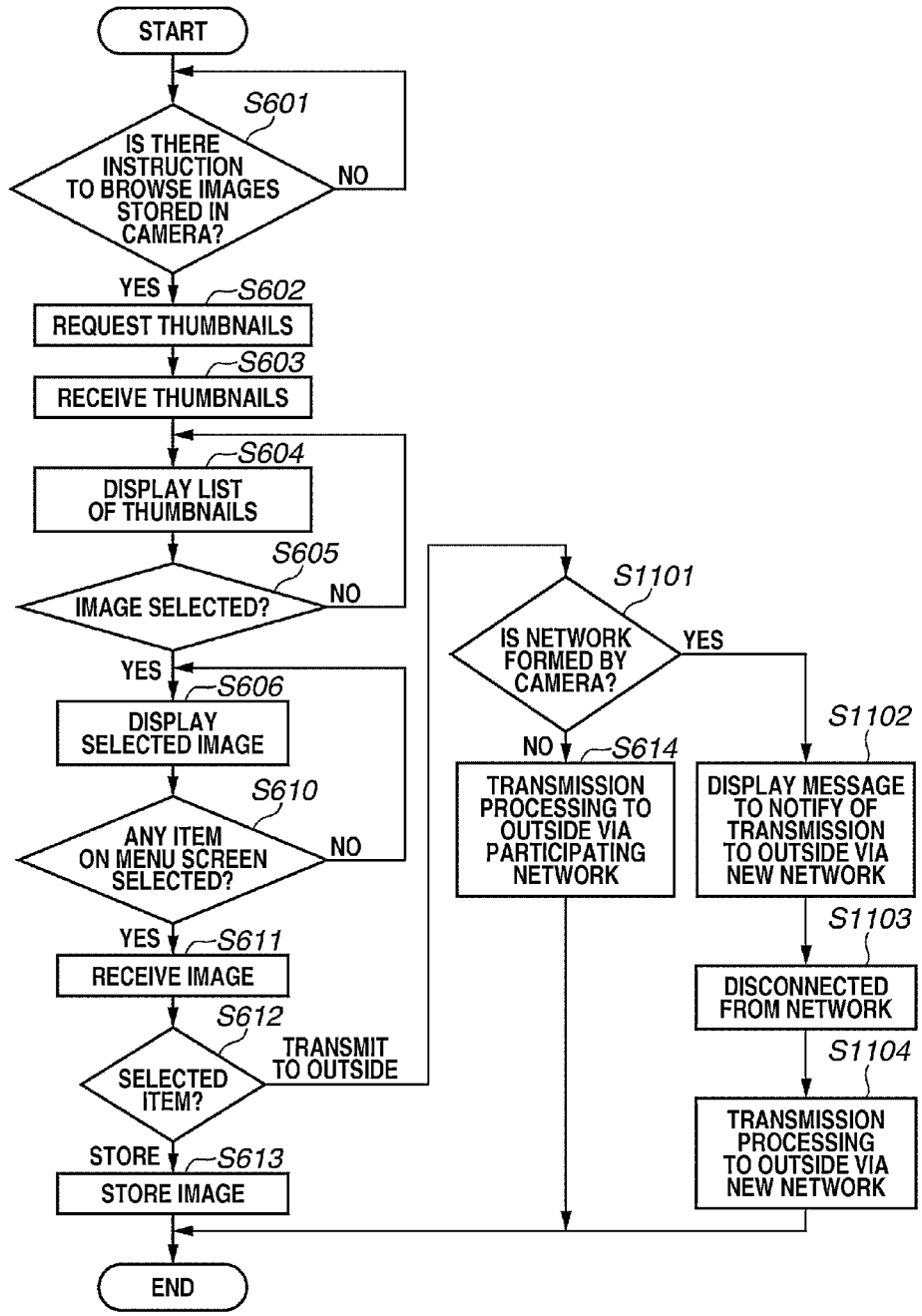
FIG. 11 is a flowchart illustrating an operation of the mobile phone according to the second exemplary embodiment.

FIG. 11 is a flowchart illustrating an operation of the mobile phone 200 in the present exemplary embodiment. The flowchart illustrates the processing after having connected to the digital camera 100, and the same step numbers are assigned regarding the processing similar to those in FIG. 6. Differences from the flowchart of FIG. 6 are steps S1101 through S1104. Further, the mobile phone 200 according to the present exemplary embodiment, even when participating in the network formed by the simple AP, ensures to enable switching to 3G network, and transmitting images from the mobile phone 200 to an external network. Thus, in the present exemplary embodiment, the processing in steps S607 through S609 is not performed.

In step S1101, the control unit 201 determine whether the network in which the mobile phone 200 is currently participating has been formed by the simple AP function of the digital camera 100. The control unit 201 performs determination in the present step by referring to a notification received from the digital camera 200 in step S406 of FIG. 4. If it is determined that the network is not a network formed by the simple AP function of the digital camera 100 (NO in step S1101), the processing proceeds to step S614. If it is determined that the network is a network formed by the simple AP function of the digital camera 100 (YES in step S1101), the processing proceeds to step S1102.

Figure 12:
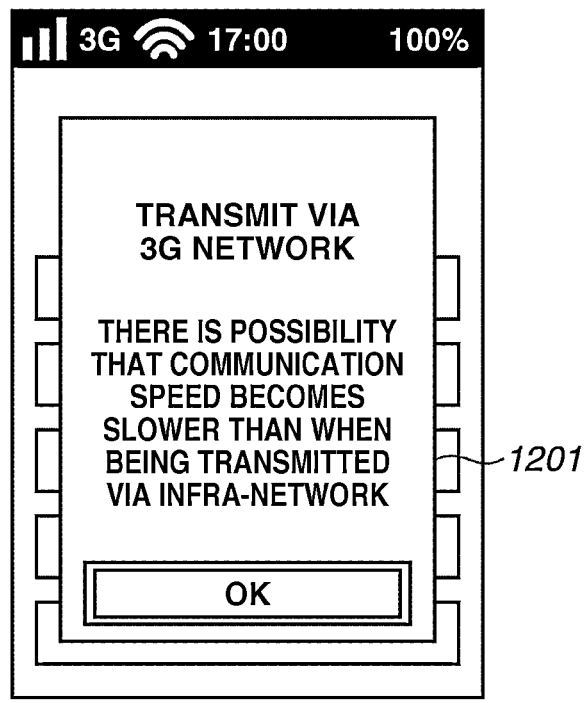
FIG. 12 is an example of a display screen according to the second exemplary embodiment.

In step S1102, the control unit 201 displays a dialog 1201 illustrated in FIG. 12 superimposed over the menu. The dialog 1201 is a message for notifying the user of that images are transmitted to the outside by switching the network to be utilized. Generally, transmission by 3G is often slower than transmission over the wireless LAN, but the user can recognize that transmission may possibly take time, from the notification.

Subsequently, in step S1103, the mobile phone 200 is disconnected from the network in which the own device is currently participating, and disconnect the connection with the AP (the digital camera 100 in this case).

Subsequently, in step S1104, the control unit 201 transmits image data to the outside by a communication method without involving the digital camera 100. In the present exemplary embodiment, the control unit 201 performs transmission of the image data by communication via 3G network using the public network connection unit 212.

As other exemplary embodiments, the control unit 201 may connect to a network formed by an AP other than the digital camera 100 using the connection unit 211, and try to transmit image data via the AP. In this case, it is desirable to perform a notification that a wireless LAN network in which the mobile phone 200 participates will be switched in place of the dialog 1201 illustrated in FIG. 12. Further, if data transmission by the public network connection unit 212 and data transmission by the connection unit 211 can be performed in parallel, in step S1102, data transmission may be performed by the public network connection unit 212 without disconnecting from the network.

The above is the operation of the mobile phone 200 in the present exemplary embodiment. The operation of the digital camera 100 is similar to the processing described in the flowchart of FIG. 8 and therefore will not be repeated.

Outline of Operation

Figure 9A:
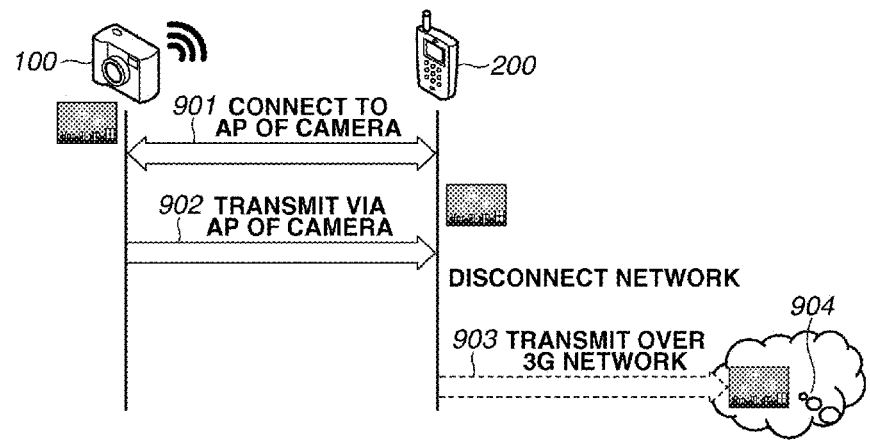
FIGS. 9A and 9B are diagrams each illustrating an outline of an operation according to a second exemplary embodiment.
Figure 9B:
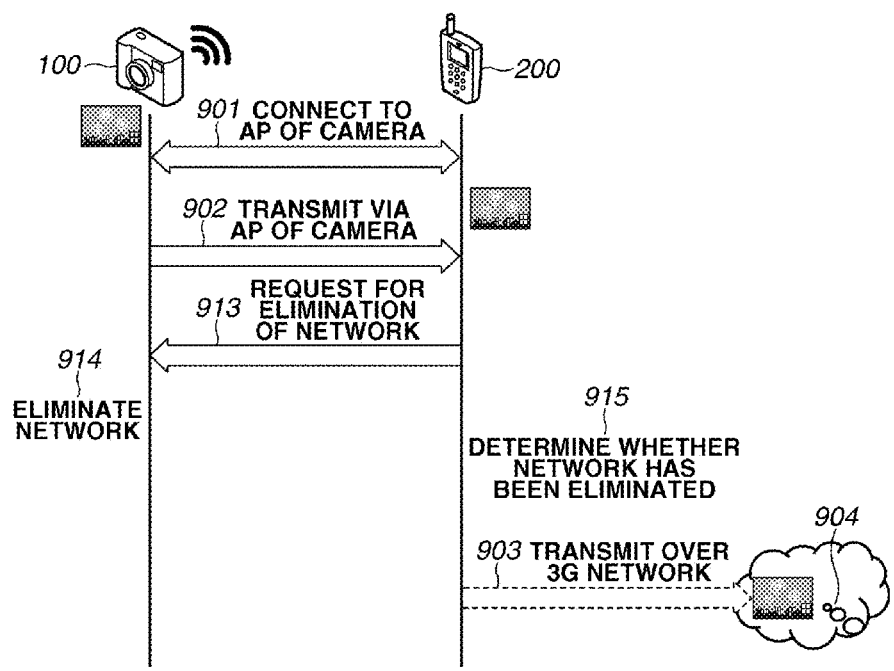
Figure 10:
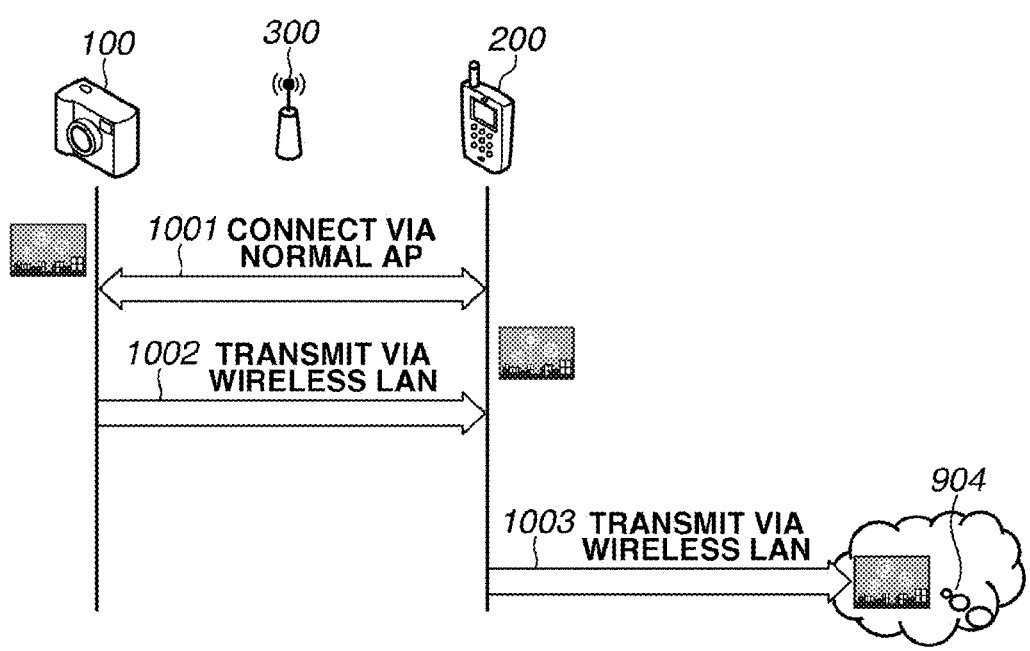
FIG. 10 is a diagram illustrating an outline of an operation according to the second exemplary embodiment.

Hereinbelow, an outline of the processing illustrated in FIG. 8 and FIG. 11 will be described with reference to FIGS. 9A, 9B, and FIG. 10. FIGS. 9A, 9B, and FIG. 10 are outline diagrams when the mobile phone 200 receives the image data which the digital camera 100 has, and transmits the received image data to an Internet 904.

First, a case where the digital camera 100 operates as an AP (in step S402 of FIG. 4) will be described with reference to FIG. 9A. In this case, at a timing 901, the digital camera 100 and the mobile phone 200 participate in a network formed by the digital camera 100, and establish communication with each other. At that time, the digital camera 100 notifies the mobile phone 200 whether the current network is a network formed by the own device (in step S406 of FIG. 4).

Then at a timing 902, the digital camera 100 transmits the image data which the own device has, to the mobile phone 200 via the wireless LAN network formed by the own device. In this process, the mobile phone 200 performs processing for transmitting the received image data to the Internet 904, and the mobile phone 200 recognizes that the current network is a network formed by the digital camera 100 by an advance notification. Thus, the mobile phone 200 disconnects from the network formed by the digital camera 100, and transmits the image data to the Internet 904 using 3G through a public line network, at a timing 903. This is an outline of the operation in a case where the digital camera 100 operates as an AP.

As an operation in a case where the digital camera 100 operates as an AP, a form illustrated in FIG. 9B is also conceivable. In the form of FIG. 9B, after the mobile phone 200 has received image data through the AP of the camera at the timing 902, the camera communication application issues a request for elimination of the formed network to the digital camera 100 connected thereto, at the timing 913. The digital camera 100 which has received the request eliminates the network formed by the simple AP function of the own device, at a timing 914. As described above, as elimination processing of the network, the digital camera 100 stops transmission of a beacon signal, and notifies the network of that the network will be eliminated. The mobile phone 200 determines whether the connected network has been eliminated, at the timing 915. If it is determined that the network has been eliminated, the mobile phone 200 transmits the image data to the Internet 904, at the timing 903.

Next, with reference to FIG. 10, a case where a network formed by an external AP 300 is used (in step S407 of FIG. 4) will be described. First, at a timing 1001, the digital camera 100 and the mobile phone 200 participate in the network formed by the external AP 300. Then, communication is established between the digital camera 100 and the mobile phone 200 via the external AP 300. Then at a timing 1002, the digital camera 100 transmits image data to the mobile phone 200 via the external AP 300, and the mobile phone 200 receives the image data. Then the mobile phone 200 performs processing for transmitting the received image data to the Internet 904, and the mobile phone 200 recognizes by the advance notification that the current network is not the network formed by the digital camera 100. Thus, the mobile phone 200 transmits the image data to the external AP 300 so that the image data is sent out to the Internet 904, at a timing 1003. This is an outline of the operation in case of utilizing the external AP 300.

The digital camera 100 performs elimination processing at a time point an elimination request of the network is received, in the present exemplary embodiment. However, the digital camera 100 may send a reply to the mobile phone 200 that the processing has been received, and thereafter the digital camera 100 may execute network elimination processing after waiting for a predetermined time. By doing so, the mobile phone 200 can be informed that the request has been received.

As described above, according to the present exemplary embodiment, even if disconnection of a network cannot be executed such as in the case of applications of the mobile phone, it becomes possible to perform uploading of the image data at an optimal network, without awareness of connection state of the network by the user.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-188703 filed Aug. 29, 2012, which is hereby incorporated by reference herein in its entirety.

What is claimed is:

1. A communication apparatus capable of participating in a network formed by an access point, the communication apparatus comprising:
   a communication interface configured to communicate with a data processing apparatus;
   a processor configured to control the communication interface to establish communication with the data processing apparatus via a network and to perform data communication with the data processing apparatus;
   wherein the communication interface is further configured to receive, after the communication apparatus participates in the network, from the data processing apparatus a notification indicating whether the data processing apparatus has formed the network as the access point and to receive a notification indicating an external access point different from the data processing apparatus has formed the network; and
   a display device configured to display a menu for accepting a predetermined instruction for transmission or reception of data via an Internet, wherein
   if it is determined that the data processing apparatus has formed the network as the access point based on the notification received by the communication interface, the processor is configured to control the display device to cause a user to recognize that the predetermined instruction is not accepted, and
   if it is determined that the external access point apparatus has formed the network based on the notification received by the communication interface, the processor is configured to thereby control the display device to cause a user to recognize that the predetermined instruction is accepted.

2. The communication apparatus according to claim 1, wherein the data processing apparatus does not include a unit for connecting to a public network.

3. The communication apparatus according to claim 1, wherein the processor controls the communication interface to establish communication with the data processing apparatus via the network formed by an access point having a gateway function, and to perform data communication with the data processing apparatus.

4. The communication apparatus according to claim 1, wherein the access point is an access point in a wireless local area network (LAN).

5. The communication apparatus according to claim 1, wherein the communication apparatus is a mobile phone.

6. The communication apparatus according to claim 1,
wherein the processor is operative to control the display device to display the menu containing a first item for accepting the predetermined instruction, and
wherein the processor controls the display unit to display the first item as invalid if it is determined that the data processing apparatus has formed the first network as the replay apparatus based on the notification received by the reception unit.

7. The communication apparatus according to claim 6, wherein the processor controls the display device to display the first item as grayed out if it is determined that the data processing apparatus has formed the network as the access point based on the notification received by the communication interface.

8. The communication apparatus according to claim 6, wherein the controller controls the display unit not to display the first item if the it is determined that the data processing apparatus has formed the first network as the access point based on the notification received by the reception unit.

9. The communication apparatus according to claim 6,
wherein the menu further contains a second item for accepting an instruction to record data received from the data processing apparatus on a recording medium of the communication apparatus, and
wherein even if the notification indicating that the data processing apparatus has formed the network as the access point is received by the communication interface, thereby the processor controls the display device not to display the second item as valid.

10. The communication apparatus according to claim 1, wherein the processor controls the communication interface to establish communication with the data processing apparatus via the network formed by the access point having a unit for connecting to a public network, and to perform data communication with the data processing apparatus, and the access point having a unit for connecting to a public network is different from the data processing apparatus.

11. The communication apparatus according to claim 10, wherein the public network is a network by third generation (3G) or long term evolution (LTE).

12. A control method of a communication apparatus capable of participating in a network formed by an access point, the control method comprising:
establishing communication with a data processing apparatus via a network, and performing data communication with the data processing apparatus;
controlling a communication interface for receiving, after communication with the data processing apparatus is established, a notification indicating whether the data processing apparatus has formed the network as the access point and to receive a notification indicating an external access point different from the data processing apparatus has formed the network, from the data processing apparatus;
displaying by a display device a menu for accepting a predetermined instruction for transmission or reception of data via an Internet; and
if it is determined that the data processing apparatus has formed the network as the access point based on the notification received, controlling the displaying unit to cause a user to recognize that the predetermined instruction is not accepted, and
if it is determined that the external access point has formed the network based on the notification, to control the display device to cause a user to recognize that the predetermined instruction is not accepted.

13. A non-transitory computer-readable recording medium storing a program for causing a communication apparatus to execute a method, the communication apparatus being capable of participating in a network formed by an access point, and the method comprising:
establishing communication with a data processing apparatus via a network, and performing data communication with the data processing apparatus;
controlling a communication interface for receiving, after communication with the data processing apparatus is established, a notification indicating whether the data processing apparatus has formed the network as the access point and to receive a notification indicating an external access point different from the data processing apparatus has formed the network, from the data processing apparatus;
displaying by a display device a menu for accepting a predetermined instruction for transmission or reception of data via an Internet; and
if it is determined that the data processing apparatus has formed the network as the access point based on the notification received, controlling the displaying unit to cause a user to recognize that the predetermined instruction is not accepted, and
if it is determined that the data processing apparatus has not formed the network as the access point based on the notification, not to control the display device to cause a user to recognize that the predetermined instruction is not accepted.

* * * * *